July 9, 1963
L. M. HUBBY
3,096,641
AUTOMATIC SYSTEM FOR MEASURING AND RECORDING
PROPERTIES OF A QUANTITY OF FLUID
Filed Jan. 15, 1959
5 Sheets-Sheet 4
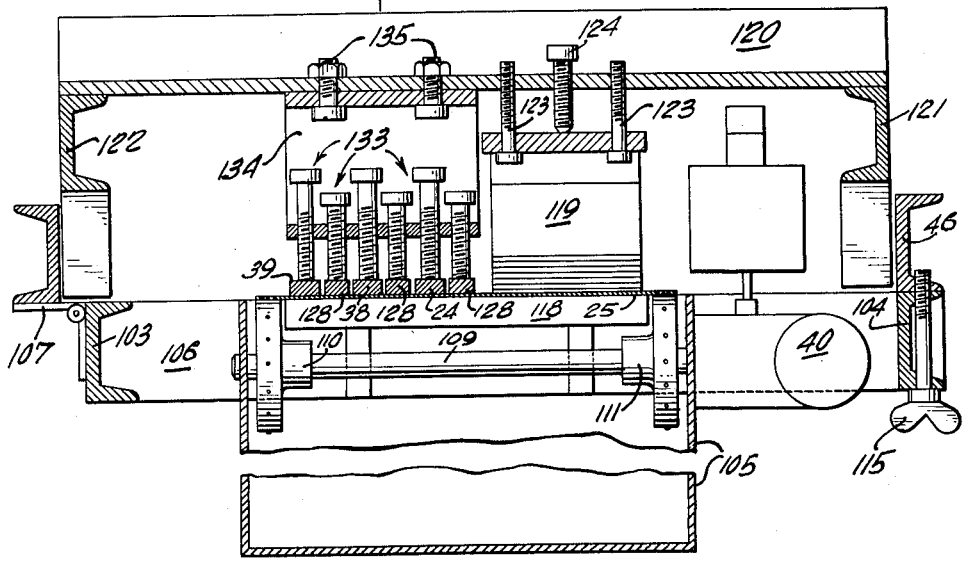
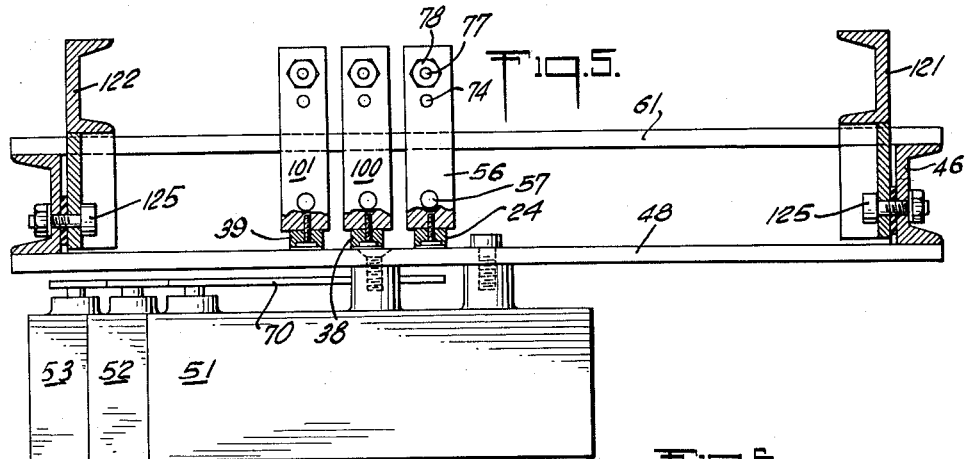
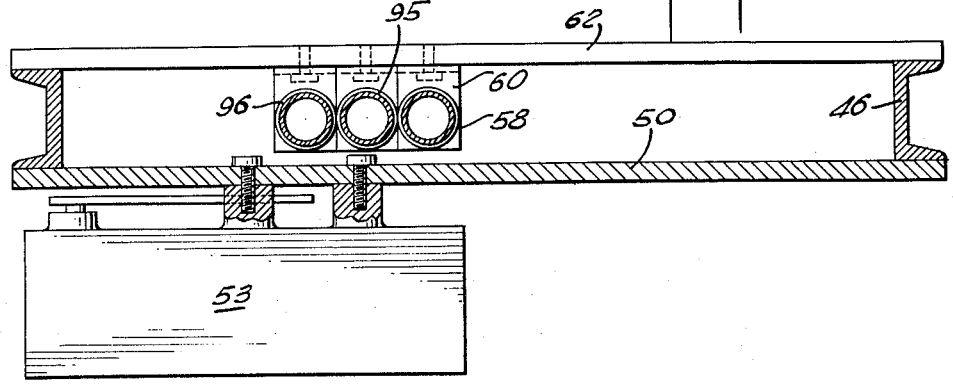

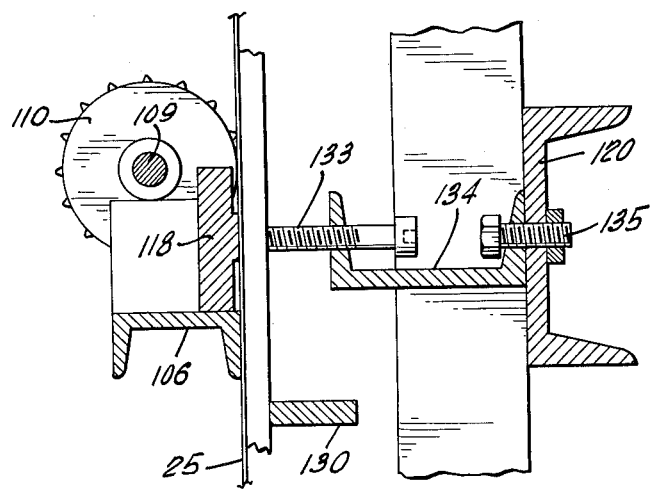
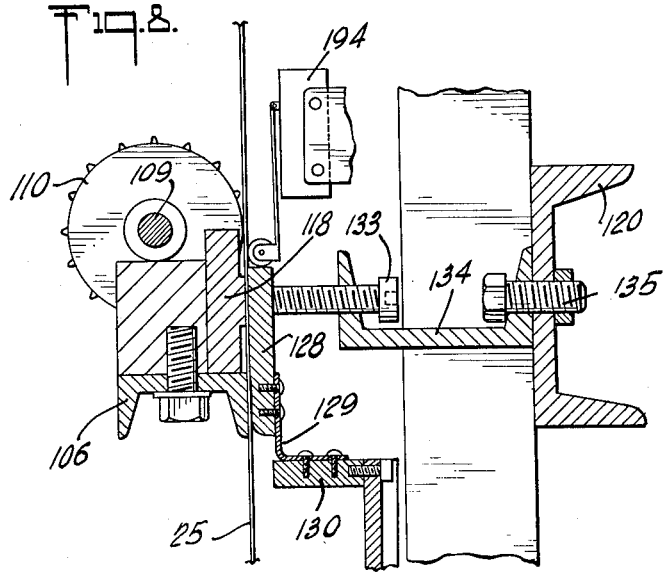

United States Patent Office 3,096,641
Patented July 9, 1963

3,096,641
AUTOMATIC SYSTEM FOR MEASURING AND RECORDING PROPERTIES OF A QUANTITY OF FLUID
Laurence M. Hubby, Bellaire, Tex., assignor to Texaco Inc., a corporation of Delaware
Filed Jan. 15, 1959, Ser. No. 787,035
6 Claims. (Cl. 73—53)

This invention is concerned with automatic measuring and recording of properties of a quantity of fluid. More specifically the invention is concerned with the measurement of certain properties of crude oil, as it is being delivered to a customer, e.g., to a pipe line for transmission to some particular customer thereafter.

The invention is concerned also with an automatic run-ticket printer, that is for use with a system like that indicated above; i.e., for a system that measures desired properties of a quantity of fluid in connection with the delivery thereof to a given destination.

The invention is also concerned with an improved pneumatic servo system. Most especially, it is concerned with one that is adapted for use in a ticket printer, in accordance with the foregoing description.

Heretofore, in the process of measuring a quantity of crude oil and delivering same to a pipe line, or to some particular customer; the operation involved the use of a human operator. This operator had to take care of operating the necessary valves in connection with filling a measuring tank, and read certain measured properties of the oil that was being thus measured. Then the operator would have to mark down the measured properties on a run-ticket, with an indication to identify the run. Thereafter, he would again operate the valves as required for delivering the quantity of crude oil to the customer.

Consequently, it is an object of this invention to provide a system for automatically handling the various steps that are involved in an operation of measuring and delivering a quantity of crude oil. Most especially, it is an object of this invention to provide a run-ticket printer that operates automatically each time a measured quantity of crude oil is delivered, and acts to cause the measured properties of this quantity of oil to be printed out on a ticket.

It is another object of this invention to provide apparatus which is able to act as an automatic run-ticket printer, and print measured properties of a given body of fluid, at predetermined intervals. This ticket printer includes elements for indicating the measured quantities and for printing a record thereof on the ticket.

It is another object of the invention to provide an improved pneumatic servo. This pneumatic servo has attributes such that it is able to provide relatively extended linear movement of a long element; the movement being in longitudinal translation thereof. Such servo movement is accomplished without undue hunting, or oscillation, of the long element.

Briefly, the invention may be described as an automatic run-ticket printer for recording measured properties of a quantity of fluid, in conjunction with delivery thereof to a pipe line, or the like. This automatic ticket printer comprises a ticket and means for measuring at least one of said properties. The printer also comprises transducer means for providing a signal proportional to at least one of said measured properties, and means located adjacent to said ticket for indicating the full range of said measured properties. In addition, the printer comprises servo means controlled by said signal for positioning said indicating means, and means for printing from said indicating means onto said ticket at a predetermined time.

Again briefly, the invention concerns a system for automatically measuring and recording properties of a quantity of crude oil, in conjunction with delivery thereof to a customer. The system comprises a quantity measuring tank for said oil, having level responsive means thereon, timing means actuated by said level responsive means, and means controlled by said timing means for recording measured properties of a quantity of oil in said tank. Said controlled means includes a ticket printer having servo means for setting indicators in accordance with said measured properties. The system also comprises means for energizing said servo means, and means for advancing said ticket printer after a ticket has been printed.

The foregoing and other objects and benefits of the invention may be more fully appreciated in connection with a specific embodiment thereof that is set forth below, and that is described in considerable detail in connection with the drawings, in which:

FIGURE 4 is an enlarged transverse cross-section view, taken along the lines 4—4 of FIGURE 2 looking in the direction of the arrows;

FIGURE 5 is another enlarged transverse cross-section view, taken along the lines 5—5 of FIGURE 2 and looking in the direction of the arrows;

FIGURE 6 is another enlarged transverse cross-section view taken along the lines 6—6 of FIGURE 2 and looking in the direction of the arrows;

FIGURE 7 is a further enlarged, detail cross-section view taken along the lines 7—7 of FIGURE 2 and looking in the direction of the arrows;

FIGURE 8 is also a further enlarged, detail cross-section view taken along the lines 8—8 of FIGURE 2 and looking in the direction of the arrows.

Figure 1:
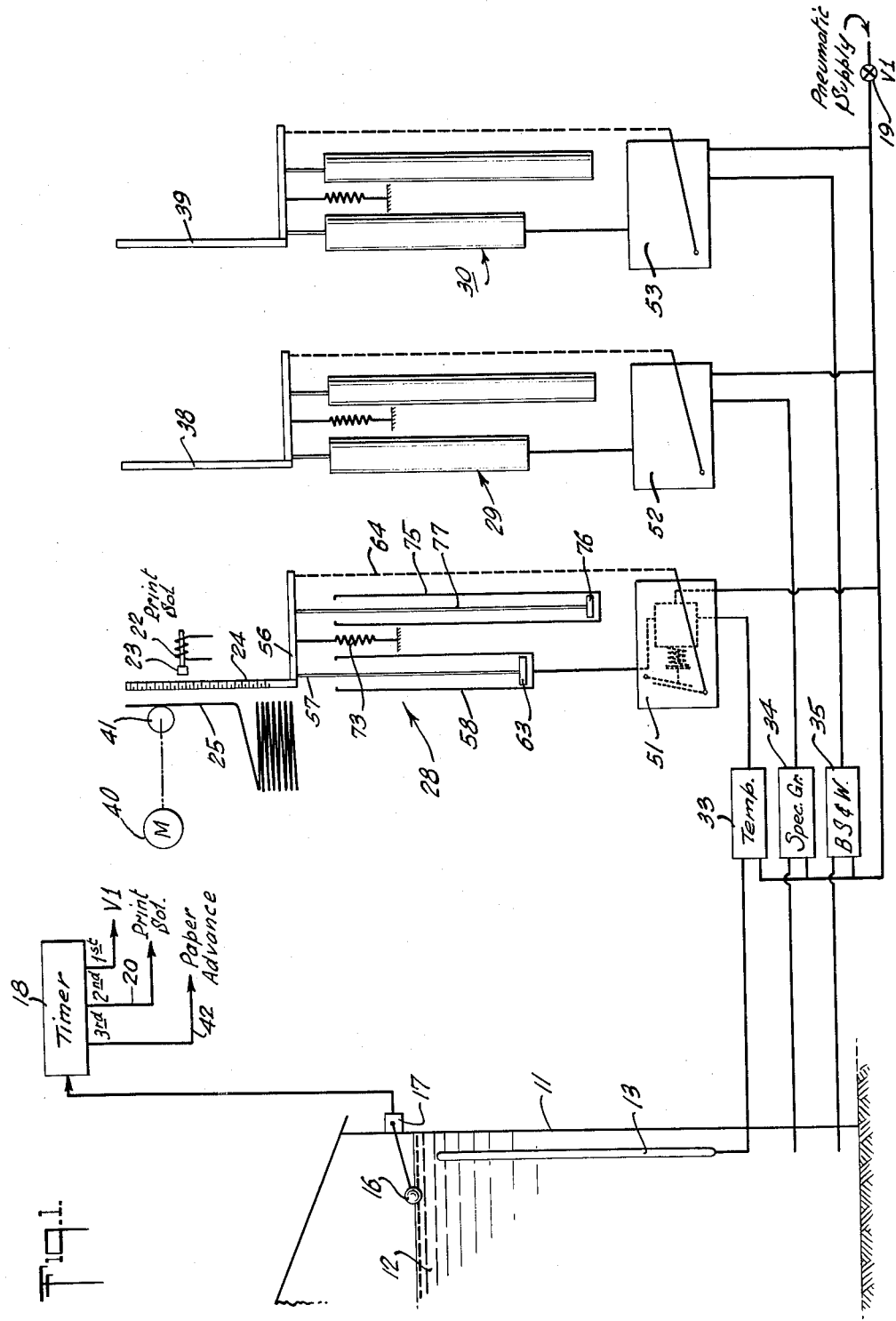
FIGURE 1 is a schematic illustration of the entire system for automatically measuring and recording properties of a quantity of crude oil.

First, referring to FIGURE 1, it is pointed out that there is illustrated a schematic showing of the entire system. This includes a measuring tank 11, into which a quantity of crude oil 12 (or similar fluid to be measured) is introduced. Within the tank 11, there are certain elements for measuring desired properties of the crude oil that is being delivered. For example, there is a temperature sensitive element 13, that extends vertically over a substantial distance within the tank 11. The sensing elements for measuring "specific gravity" and B.S.&W. are not illustrated. However, it will be understood that the sensing element for specific gravity measurement is a standard item that is well known, and need not be illustrated. The sensing element for the B.S.&W. may take the form disclosed in a copending application of the same inventor, Serial No. 578,604 filed April 17, 1956, now Patent No. 2,958,223. It will be understood by anyone familiar with this art that the abbreviation B.S.&W. stands for "basic sediment and water." It is pointed out that the sensing elements provide signals that are mechanical in nature so that in each case a transducer may be actuated to produce a pneumatic pressure output that is proportional to the sensing element signal.

The tank 11, is a known volume and is employed to measure the quantity of crude oil contained therein, each time it is filled to an upper level that may be accurately determined in any convenient manner. When the upper level of crude oil 12 in the tank 11 is reached, the body of crude oil actuates a float 16, that is connected to a switch 17 which is schematically illustrated. When the switch 17 is actuated by the lifting of the float 16, an electrical signal is transmitted to a timer 18 which begins a cycle of operations that involves sending out three different signals in sequence, with a predetermined time delay in between. The details of the structure of timer 18, may take any feasible form. These details form no part, per se, of the invention.

The first signal that the timer 18 sends out, is indicated as a signal marked V1 on the drawing. It will be observed that this signal is employed to control actuation of pneumatic supply valve 19 that has the caption V1 applied thereto. The valve 19 controls the source of supply of pneumatic fluid; which source is employed in energizing the pneumatic servo systems.

The second signal from timer 18 is sent after a predetermined time delay, which is sufficient to allow the servo systems to settle down and indicate in accordance with each of the three properties of the crude oil 12, i.e., temperature, gravity and B.S.&W. This second signal goes over a circuit 20 to energize a print solenoid 22 that acts to drive a hammer 23 against an indicating strip 24 that has indicia thereon, as illustrated, to indicate the measured property of the crude oil as it then exits. Therefore, this causes an indication of the measured property to be printed on a ticket 25, that is held in position adjacent to the strip 24 in a manner more fully illustrated in other figures of the drawings, and which is described in more detail below.

It will be observed that there is a servo system 28, as well as similar servo systems 29 and 30. Servo system 28 acts to position the strip 24 vertically in accordance with the temperature that is being measured by the sensitive element 13 in the tank 11. This is carried out in conjunction with a temperature transducer 33. This transducer may take any feasible form, and constitutes no part, per se, of the invention. There are many commercial instruments available, e.g. The Foxboro Company has a Temperature Transmitter Type 12A and also a Type M/42 Transmitter that may provide a pneumatic output signal of from three to fifteen pounds per square inch, on the measurement of any variable. The pneumatic pressure signal output of the temperature transducer 33 is applied as a control signal for the servo system 28 so that the strip 24 will be positioned in accordance with the temperature as measured by the sensitive element 13.

In a similar manner, each of the properties of the crude oil 12 that are being measured, are transformed into a pneumatic pressure signal. For specific gravity measurement there is a transducer 34, and for B.S.&W. there is a transducer 35.

It will be observed that the servo system 29 positions a strip 38 for indicating the measured value of the specific gravity of the oil 12. Similarly, the servo system 30 positions a strip 39 that indicates the value of the B.S.&W. for the given quantity of crude oil 12.

It is pointed out that although the three indicator strips 24, 38, 39 are widely separated from one another in FIGURE 1, this is merely a schematic manner of illustrating these elements; and in the actual construction all three of these strips are located side by side and adjacent to the ticket 25.

Each of the three servo systems 28, 29 and 30 are substantially identical in structure and the details thereof will be set forth in greater detail below.

The third signal that is sent out from the timer 18 is instrumental in actuating a paper advance mechanism, as is indicated by the captions. It is pointed out that this paper advance signal goes over a circuit indicated by an arrow 42. It acts to energize a motor 40 which drives a sprocket 41 that acts to move the ticket 25 up to the next position ready for receiving the next set of measured properties of the next quantity of crude oil to be measured.

Operation—FIGURE 1

The operation of the crude oil property measuring and recording system, that is illustrated schematically in FIGURE 1 may be briefly described as follows. When a given run (measured quantity) of crude oil is to be delivered to a customer, or to the pipe line for a customer, the oil 12 is flowed into the tank 11 by pumping or otherwise. When the oil reaches the full level, as indicated by raising of the float 16, the switch 17 will be actuated and thus the timer 18 will begin a timing cycle. During this timing cycle, properties of the tank full of crude oil 12 are measured by the sensitive elements (e.g. temperature sensitive element 13), and the transducers 33, 34 and 35 are conditioned to provide output signals that are proportional to the measured properties. Therefore when the timer 18 provides its first signal and it causes the valve 19 to be opened, the pneumatic supply energizes all of the servo systems 28, 29 and 30 so that the control signal transducers 33, 34 and 35 will each provide a pneumatic signal to cause each of the elements 24, 38 and 39 respectively to be positioned in accordance therewith. Then following sufficient time delay for allowing the servos to reach a steady state position at each of the strips 24, 38 and 39; the "print solenoid" signal will be sent out from timer 18 via circuit 20 and the print solenoid 22, will be energized. This energizing of solenoid 22 causes a print out of the information that is on the strips 24, 38 and 39 onto the ticket 25; and thus makes a record of the measured properties of the crude oil 12 that is then in the tank 11. Finally, a third signal from timer 18 will be sent over the paper advance circuit 42 indicated, and thus the motor 40 will be energized to drive the sprocket 41 and position the ticket 25 to its next location for receiving the data of the next tank full of oil.

Ticket Printer Structure

Referring to FIGURES 2 through 8, the details of the actual structure of a particular ticket printer according to the invention will be described. This structure is concerned with the run-ticket printer itself. The relationship of the ticket printer to the total measuring system (illustrated in FIGURE 1) will become apparent as the structure of the ticket printer itself is understood. It is to be noted that whenever an element that is illustrated in the FIGURE 1 showing, is found in the structure illustrated in FIGURES 2 through 8, the same reference number is employed for such corresponding elements.

The principal elements of the ticket printer are supported on a framework 46 which has a base, or standard 47 at the bottom thereof, upon which the framework 46 rests.

There are three cross members 48, 49 and 50 that add stiffness to the framework 46 and that each supports a rectangular control box 51, 52 and 53 respectively. Each of these boxes 51, 52 and 53 contains control valve mechanism therein that is the part of the servo system in each case which controls the position of one of the three strips 24, 38 and 39 respectively. This control valve structure, for each of the boxes 51, 52, 53 is substantially identical and will be described below in greater detail in connection with the FIGURE 9 illustration.

Figure 3:
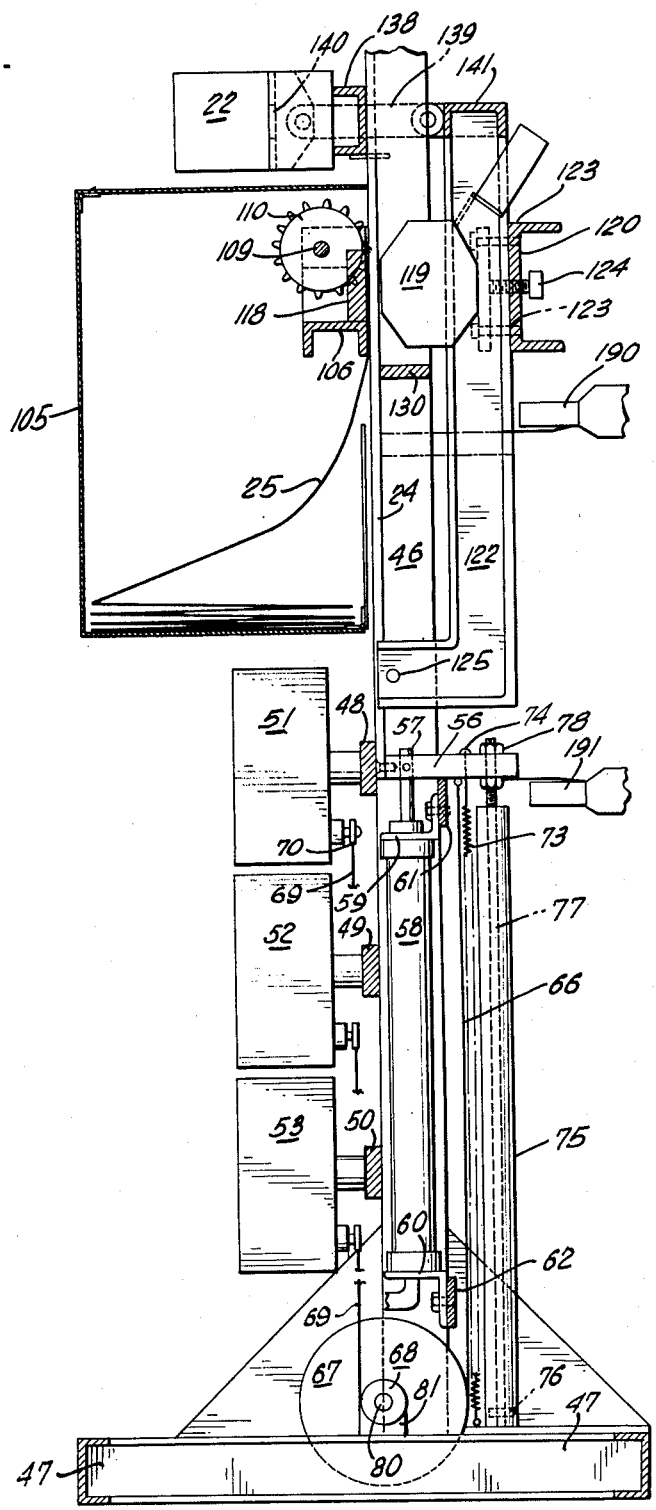
FIGURE 3 is a longitudinal cross-section view, taken along the lines 3—3 of FIGURE 2 and looking in the direction of the arrows.

Referring principally to FIGURE 3, some of the elements of the servo system 28 (FIGURE 1) will be described. It is pointed out that the temperature indicator strip 24, is attached at the lower end thereof to a horizonally situated arm 56 that extends front to back relative to the framework 46. Arm 56 is attached to a piston rod 57, and is supported thereby near the extremity of the piston rod. The piston rod 57 is shown in its retracted position in FIGURE 3, such that the arm 56 rests on a cross support plate 61 that goes horizontally across the back of the framework 46. Piston rod 57 extends vertically from the top of a cylinder 58 with which it is operatively associated. The cylinder 58 is attached to the framework 46 by a pair of brackets 59 and 60 which, in turn are bolted to the cross support plate 61 and a similar plate 62 (located near the bottom of cylinder 58) respectively. Cross support plates 61 and 62 are fastened to the framework 46 in any convenient manner, e.g. by welding, as are the cross members 48, 49 and 50, likewise.

The indicator strip 24 is translated vertically by the movements of the piston rod 57, as determined by a piston 63 (FIGURES 1 and 9) within cylinder 58. This vertical indicator positioning movement, is determined by the servo system 28 that has its control valve mechanism within the box 51. The vertical extent of the position of the strip 24 is proportional to the measured property (which is in this case the temperature of the oil) by having elements connected to, and which act in conjunction with, the control valve mechanism within the box 51. These connections include a mechanical follow-up (dashed line 64—FIGURE 1) which is directly determined by the position of the strip 24. This follow-up connection includes a flexible cable 66 that is attached to the arm 56. The lower end of the cable 66 is wrapped around in a groove on the periphery of a pulley wheel 67, and is fastened down to the pulley wheel so that as the wheel 67 rotates, the cable 66 unwraps or wraps up on the pulley without any relative slippage therebetween. There is a small diameter pulley wheel 68, that is securely fastened to the wheel 67 and is situated coaxially therewith, so that these two pulleys rotate together at all times. There is another flexible cable 69 that wraps around and is securely fastened to, the periphery of the pulley 68 in a groove thereon. The cable 69 extends upward and attaches to the extremity of a crank arm 70 of the control box 51. The cable 69 is shown broken off in FIGURE 3, in order to make the showing less confusing.

It will be observed that the mechanical follow-up connections just described provide an arrangement such that there is a reduction in linear movement between the strip 24 and the tip, or extremity, of the crank arm 70.

In order to render the extent of movement of the piston 63 and piston rod 57, proportional to the pressure applied to the cylinder 58; there is a spring 73 that is attached at the top thereof to the cross arm 56 in any convenient manner, as by means of having an enlarged head 74 on the top end of the extension of the spring 73, that passes through a hole in the arm 56. At the bottom end of the spring 73, it is attached to the framework at the base 47, in any convenient manner e.g. by hooking into an eye-loop as illustrated.

Adjacent to the spring 73, there is a motion damping cylinder 75 that has a piston 76 therein carried at the extremity of a piston rod 77. Piston rod 77, in turn, is secured to the arm 56 in a convenient manner, e.g. by means of being bolted thereto in the manner illustrated. Thus, the upper extremity of the piston rod 77 is threaded and so the rod is secured to the arm 56 by tightening a pair of nuts 78. The cylinder 75 is attached at the base thereof to the framework 46 of the supporting structure, i.e. at the base 47.

The pulley wheels 67 and 68 are carried on a shaft 80, about which they may freely rotate. The shaft 80 is supported at one end by a bracket 81, and at the other end by being attached to the framework 46 in a convenient manner, e.g. by being bolted thereto, as illustrated in FIGURE 2.

Figure 2:
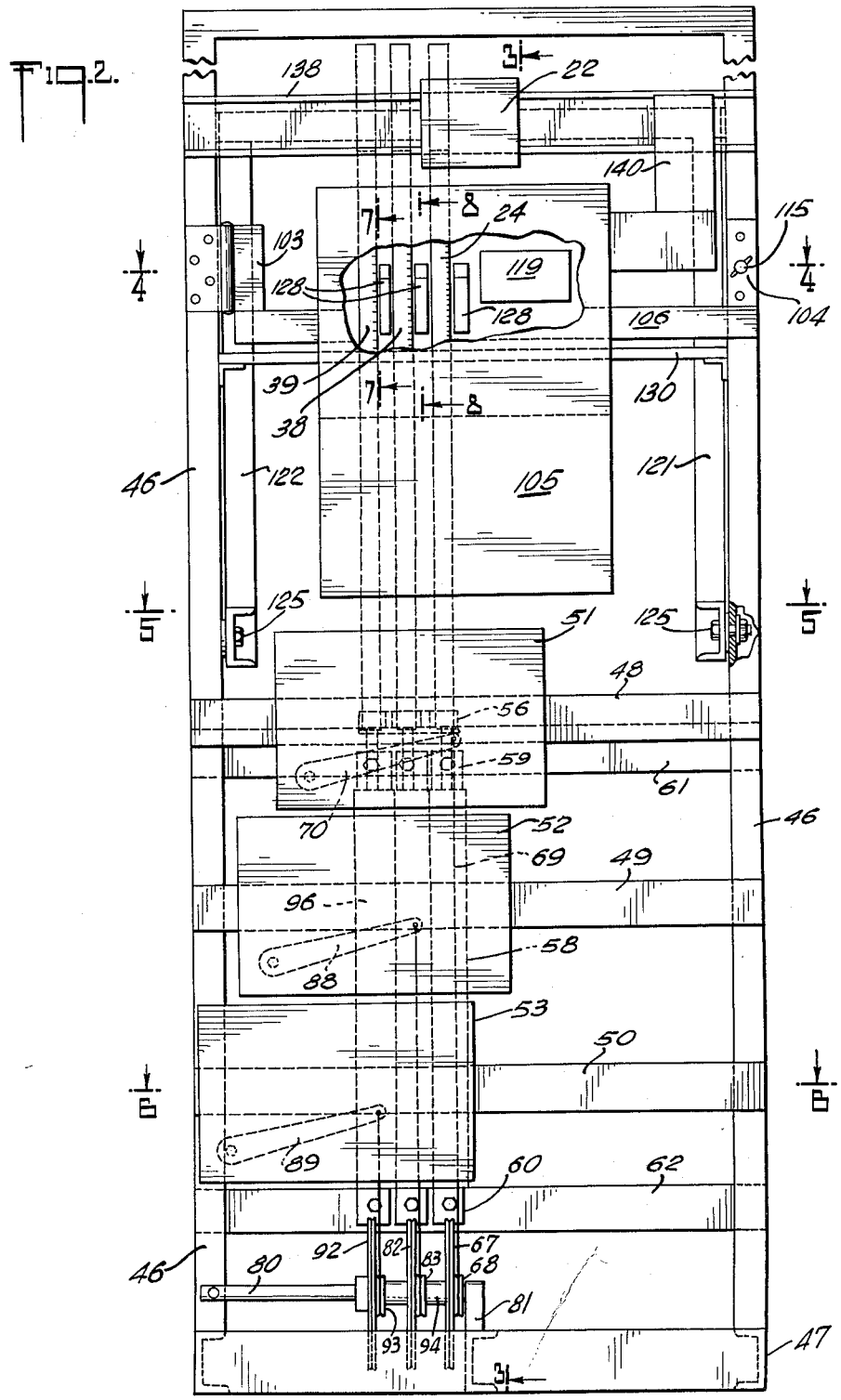
FIGURE 2 is a front elevation of the run-ticket printer apparatus. This view is partially broken away to show interior elements of the printer.

Referring especially to FIGURE 2, some of the elements of the other two servo systems i.e. 29 and 30, will be also described as to their structure. Carried on the shaft 80 there is another set of pulley wheels 82, and 83. These pulley wheels are associated with the servo system 29 that positions the indicator strip 38 (for specific gravity indication). These wheels 82 and 83 are attached together for rotation as a unit at all times and are mounted for free rotation about the shaft 80. Furthermore, pulley wheels 82 and 83 have cables corresponding to the cables 66 and 69 respectively. These cables are attached to the pulley wheels 82 and 83 in the same manner as cables 66 and 69 are attached to pulley wheels 67 and 68, i.e. they are wrapped around the periphery of each pulley wheel and securely fastened so as to provide a tangential connection with the pulleys at all times. The pulley wheels 82 and 83 act in conjunction with the control box 52 which has a crank arm 88 thereon.

In like manner the third servo system 30 includes the control box 53 which has a crank arm 89 in connection therewith, and which employs a pair of pulley wheels 92 and 93.

The three pairs of pulleys 67—68, 82—83 and 92—93 will be maintained spaced apart along the shaft 80 in any convenient manner, such as by use of spacer sleeves 94 as illustrated.

Referring to FIGURE 6, it will be observed that there are three cylinders located side by side, one for each of the pairs of pulleys. The cylinder 58 is associated with the pulleys 67 and 68 by having the cable 66 attached to the pulley 67, while a cylinder 95 is associated with the middle pair of pulleys 82 and 83 in a similar manner and a third cylinder 96 is associated with the other pair of pulleys 92 and 93.

Referring to FIGURE 5, it will be noted that there are individual arms that are attached to the piston rods associated with each of the cylinders. Thus, in addition to the arm 56 (which is associated with the cylinder 58) there is a horizontal arm 100 that is associated with the cylinder 95, and another arm 101 that is associated with the cylinder 96. It will be noted that the arm 101 has the indicator strip 39 attached thereto. It will be clear that the structure of the elements for each of the three cylinders, and the associated elements, are substantially identical so that the description of one of these sets of elements will be sufficient for a complete understanding of all three.

Referring especially to FIGURES 2, 3, 4, 7 and 8, the elements at the top of the ticket printer will be described. It is pointed out that there is a housing 105 that contains, and acts as a magazine for, the ticket 25 (see FIGURE 1). The housing 105 is supported by a channel beam 106 that has integral, vertical extremities 103 and 104. The beam 106 is supported on the framework 46 by a hinge 107 that is spot welded or otherwise fastened to the extremity 103 and the framework 46. This allows the housing 105 to be swung back away from the front of the framework 46 for access to the ticket magazine, and the other elements within the housing 105. Attached to the housing 105, so that it is also supported by the beam 106, there is the ticket-advance motor 40 (FIGURE 1) that is geared to a shaft 109 which has sprocket wheels 110 and 111 securely attached thereto, for rotation therewith, in order that the ticket 25 may be advanced by means of perforations (not shown) that are located along the edges of the ticket.

There is a wing headed bolt 115 that is carried by the vertical extremity 104 and the beam 106. This is employed to secure the channel beam in operative position, when the beam 106 is against the front face (when viewed as shown in FIGURE 2) of the framework 46.

Within the housing 105, and also mounted on the cross member 106 there is an anvil 118 that extends horizontally across the width of the ticket 25. Anvil 118 is situated between the ticket-drive, rachet wheels 110 and 111. It has a flat smooth anvil surface presented toward one side of, and in contact with, the ticket 25. Situated toward one edge of the ticket 25, on the other side from the anvil surface of anvil 118; there is a time-and-date stamp unit 119, that provides indicia markers (not shown) on the face thereof which are constantly driven by a timing mechanism (self contained) so as to always present an indication of the date and time, ready for impression upon the ticket 25 at desired intervals. The time-and-date stamp unit is adjustably mounted on a pivotally mounted cross support channel 120. Cross channel 120 is welded to, for support by, a pair of pivot arms 121, and 122. Pivot arms 121 and 122, are pivotally attached to the framework 46 by means of bolts 125 as clearly illustrated in FIGURE 5. The adjustable mounting for the time-and-date stamp 119 comprises four corner bolts 123 that draw the base of the date stamp unit against a central set screw type of bolt 124. In this manner, the time-and-date stamp unit may be adjusted for proper alignment of the indicia on the face thereof, with respect to the anvil 118 situated on the opposite side of the ticket 25.

Toward the other edge of the ticket 25 from the time-and-date stamp 119, there are a plurality of reference-marker elements 128. There are three of these reference-marker elements 128, one located beside each of the indicator strips 24, 38 and 39 respectively.

These reference marker elements may have any feasible or desirable type of indicia thereon, for providing a reference mark relative to each indicator strip, that indicates the measured value of the particular property that is being indicated by the position of the strips 24, 38, and 39. Thus the indication marker on each of the reference marker elements 128 may be an arrow, as is shown in FIGURE 2.

Referring to FIGURE 8, it is to be observed that each of the reference marker elements 128 is mounted for spring biased pivotal movement toward and away from the anvil 118. The spring holds the element 128 away from the paper of the ticket 25, in each case. This mounting may be accomplished in any convenient manner; but it is preferred to employ structure such as that illustrated in FIGURE 8. There is a flexible strip 129 that is securely fastened to the reference marker element 128 near the lower edge thereof, and is also fastened to a support member 130 which extends across from one side of the framework 46 to the other.

Supportedly carried by the cross channel 120 for pivotal movement therewith, there are a plurality of hammers 23 (FIGURE 1) which take the form of bolts 133 (FIGURES 4, 7 and 8) that have smooth tips thereon for acting as hammers. These bolts, or hammers 133 are threaded through holes in one flange of a short piece of channel beam 134. The other flange of the channel beam 134 is drilled with a pair of holes for accommodating bolts 135 that pass therethrough in order to secure the channel beam to the cross channel 120; so that the bolt-hammers 133 are all supported by, and move with, the pivotally supported cross channel 120. The bolts 133 are threadably supported in the flange of the channel beam 134 so that they may be individually adjusted by turning the bolts as desired.

The print solenoid 22 is mounted near the top of the framework 46, and is supported by a cross channel 138. There is a pivot-link 139 that connects an armature 140 of the solenoid 22 with a top cross channel beam 141 that connects the pivot arms 121 and 122 together.

It will be appreciated that there may be more than one solenoid employed if desired, to increase the effective force of the printing action.

Referring to FIGURE 3 it will be noted that when the print solenoid 22 is energized it will pull its armature 140 to the left; and by means of the connecting link 139, it will rock the pivoted structure (including cross channel 120 about its pivots (bolts 125) on the framework 46, so as to cause the hammer bolts 133 as well as the time-and-date stamp unit, to be drawn into pressure contact with one face of the ticket 25 against the anvil 118 on the other side of the ticket. The ticket 25 is chemically treated so that the pressure of the marking elements against it will cause a printing of the indicia onto the ticket.

It will be observed that because of the length of the strips 24, 38 and 39; when the bolt-hammers 133 in connection with each of these strips, is moved toward the ticket 25 (and the anvil 118 behind), the indicia on the strips will print out for several indications along the length of the face of each strip on each side of the desired indication. This does not render the printing of the measured quantities inaccurate, because the reference markers always remain in the same position since they are mounted on a member that is attached firmly to the framework at all times. Therefore the reference markers will print a mark that indicates the exact measured value that is being indicated by the position of each of the strips 24, 38 and 39 respectively.

It will be observed that there are certain auxiliary features to prevent any faulty operations of the system. Among these is a pair of limit switches 190 and 191 (see FIGURE 3) that are located so as to be actuated by the movement of arm 56 as it reaches the limiting positions thereof. These two limit switches are connected into the control circuit so as to prevent printing, if the type bar (strip 24) is positioned outside of the normal range therefor. There may be two other pairs of limit switches (not shown) one for each of the type bars, i.e. strips 38 and 39. However, switches 190 and 191 may be actuated by any of the three type bar positions in common, if the range of movements of all three are the same.

Another auxiliary feature is a "no paper" switch 194 (see FIGURE 8), that is employed to act in the oil measuring and recording system so as to prevent delivery of the measured tank of oil 12 (FIGURE 1) in the event there is no ticket in the printer to record the run.

While there has been described a specific embodiment of the invention in considerable detail in accordance with the applicable statutes, this is not to be taken as in any way limiting the invention but merely as being descriptive thereof.

What is claimed as the invention is:

1. An automatic run-ticket printer for recording measured properties of a quantity of fluid in conjunction with delivery thereof to a pipeline or the like comprising, a ticket, means for measuring at least one of said properties, means for supplying pneumatic fluid pressure including a valve controlled by timing means, said timing means being actuated by means responsive to the level of said quantity of said fluid, transducer means for providing a pneumatic signal proportional to said measured property, means located adjacent to said ticket for indicating the full range of said measured property, pneumatic servo means controlled by said signal for positioning said indicating means, and means for printing from said indicating means onto said ticket at a predetermined time, said timing means providing a sufficient delay after actuation of said valve to permit energization and response of said pneumatic servo means.

2. An automatic run-ticket printer for recording measured properties of a quantity of fluid in conjunction with delivery thereof to a pipeline or the like comprising, a ticket, means for measuring at least one of said properties, means for supplying pneumatic fluid pressure including a valve controlled by timing means, said timing means being actuated by means responsive to the level of said quantity of said fluid, transducer means for providing a pneumatic signal proportional to said measured property, means located adjacent to said ticket for indicating the full range of said measured property, pneumatic servo means having a positioning member connected to said indicating means and controlled by said pneumatic signal, and means for printing from said indicating means onto said ticket at a predetermined time, said timing means providing a sufficient delay after actuation of said valve to permit energization and response of said pneumatic servo means.

3. An automatic run-ticket printer for recording measured properties of a quantity of fluid in conjunction with delivery thereof to a pipeline or the like comprising, a ticket, means for measuring at least one of said properties, means for supplying pneumatic fluid pressure including a valve controlled by timing means, said timing means being actuated by means responsive to the level of said quantity of said fluid, transducer means for providing a pneumatic signal proportional to said measured property, strip means located adjacent to said ticket and having indicia on the side next to said ticket, said indicia encompassing the full range of said measured property, pneumatic servo means having a positioning member connected to said strip means for translating said strip relative to a reference marker, an anvil on the other side of said ticket from said strip means, hammer means for causing said indicia and said reference marker to strike the ticket against said anvil to print the indication of said measured property on the ticket, and means for actuating said hammer means at a predetermined time, said timing means providing a sufficient delay after actuation of said valve to permit energization and response of said pneumatic servo means.

4. An automatic run-ticket printer for recording measured properties of a quantity of fluid in conjunction with delivery thereof to a pipeline or the like comprising, a ticket, means for measuring at least one of said properties, means for supplying pneumatic fluid pressure including a valve controlled by timing means, said timing means being actuated by means responsive to the level of said quantity of said fluid, transducer means for providing a pneumatic signal proportional to said measured property, strip means located adjacent to said ticket and having indicia on the side next to said ticket, said indicia encompassing the full range of said measured property, pneumatic servo means having a positioning member connected to said strip means for translating said strip relative to a reference marker, an anvil on the other side of said ticket from said strip means, hammer means for causing said indicia and said reference marker to strike the ticket against said anvil to print the indication of said measured property on the ticket, and electric solenoid means for actuating said hammer means at a predetermined time, said timing means providing a sufficient delay after actuation of said valve to permit energization and response of said pneumatic servo means.

5. An automatic run-ticket printer for recording measured properties of a quantity of fluid in conjunction with delivery thereof to a pipe line or the like comprising, a ticket, means for measuring at least one of said properties, means for supplying pneumatic fluid pressure including a valve controlled by timing means, said timing means being actuated by means responsive to the level of said quantity of said fluid, transducer means for providing a pneumatic pressure signal proportional to said measured property, a longitudinally slidable strip located adjacent to said ticket, indicia on the face of said strip adjacent to said ticket, said indicia encompassing the full range of said measured property, pneumatic servo means including a cylinder and piston, said piston being connected to said strip for sliding same longitudinally, a reference marker pivotally supported relative to said ticket, an anvil located on the other side of said ticket from said marker and said strip, a pair of hammers carried by a solenoid actuated support and located adjacent to said reference marker and said strip in lateral alignment with one another, and electric solenoid means associated with said support for causing said hammers to strike said marker and said strip onto said ticket and against said anvil at a predetermined time for printing the run information, said timing means providing a sufficient delay after actuation of said valve to permit energization and response of said pneumatic servo means.

6. An automatic run-ticket printer for recording measured properties of a quantity of fluid in conjunction with delivery thereof to a pipeline or the like comprising, a ticket, means for measuring at least one of said properties, means for supplying pneumatic fluid pressure including a valve controlled by timing means, said timing means being actuated by means responsive to the level of said quantity of said fluid, transducer means for providing a pneumatic pressure signal proportional to said measured property, a longitudinally slidable strip located adjacent to said ticket, indicia on the face of said strip adjacent to said ticket, said indicia encompassing the full range of said measured property, pneumatic servo means including a cylinder and piston, said piston being connected to said strip for sliding same longitudinally, a reference marker pivotally supported for no translation relative to said ticket, an anvil located on the other side of said ticket from said marker and said strip, a pair of hammers carried by a solenoid actuated support and located adjacent to said reference marker and said strip in lateral alignment with one another, electric solenoid means associated with said support for causing said hammers to strike said marker and said strip onto said ticket and against said anvil at a predetermined time for printing the run information, and electric motor means for advancing said ticket to the next position for printing a subsequent run thereon, said timing means providing a sufficient delay after actuation of said valve to permit energization and response of said pneumatic servo means.

References Cited in the file of this patent
UNITED STATES PATENTS

| | | |
|---|---|---|
| 224,147 | Cayce | Feb. 3, 1880 |
| 1,414,388 | Wilson | May 2, 1922 |
| 2,210,868 | Larson | Aug. 6, 1940 |
| 2,596,366 | Brockett | May 13, 1952 |
| 2,716,341 | Ilfrey et al. | Aug. 30, 1955 |
| 2,757,062 | Hood | July 31, 1956 |

OTHER REFERENCES

"How Shell Designs an Automatic Lease," The Oil and Gas Journal, Oct. 17, 1955 (pp. 111–117). (Copy in 73–221.)